United States Patent Office 3,422,033
Patented Jan. 14, 1969

3,422,033
METHOD OF CRYSTALLIZING ALUMINO-
SILICATES
Henry D. Ballard, Jr., Dolton, John Mooi, Homewood, and Edward S. Rogers, Hinsdale, Ill., assignors to Sinclair Research, Inc., New York, N.Y., a corporation of Delaware
No Drawing. Filed May 25, 1965, Ser. No. 458,744
U.S. Cl. 252—455   12 Claims
Int. Cl. B01j 11/00

ABSTRACT OF THE DISCLOSURE

A treatment for crystallizing silica-alumina hydrogel to form crystalline aluminosilicates providing superior hydrocarbon conversion catalysts comprises treating the gel with an aqueous solution of a strongly basic, lower alkyl-substituted ammonia until the gel is converted to a crystalline material, neutralizing the base, and drying the resultant solid. A preferred lower alkyl-substituted ammonia is tetramethy ammonium hydroxide.

---

This invention pertains to a novel contact material and to a method for its manufacture. The contact material contains a portion of a crystalline aluminosilicate with pores of controlled size in the range of about 6–15 angstrom units.

Crystalline aluminosilicates having micropores of controlled, small size have been found useful in a number of contexts and often because of certain defects in physical properties or because of their high cost are proposed for use in association with other oxides of metals, often having atomic numbers of 12–14. For example, U.S. Patent 3,025,233 has a filter which contains a minor portion of crystalline aluminosilicate, the major portion being various forms of alumina or other aluminum compounds used as binders, extenders, adsorbers, etc. U.S. Patent 2,865,867 mixed alumina with a crystalline aluminosilicate to obtain particles of greater hardness.

The resulting composites or mixtures require a complex of exacting manufacturing steps to give the desired products; thus these products are expensive. In this invention contact materials having a crystalline aluminosilicate portion and a noncrystalline silica-alumina portion are produced by treating a silica-alumina hydrogel with a strongly basic organic substituted-ammonia for a period of time sufficient to convert a desired portion of the gel to a crystalline form or crystal precursor. Generally, the amorphous aluminosilicate hydrogel may be treated for about 1 to 72 hours at a temperature from 0° C. to the decomposition temperature of the base, until about 1 to 75%, preferably about 5 to 50% of the silica-alumina is converted into a crystalline material. This base treated product can then be neutralized either by heating to decompose the base or by addition of an acid which can be removed on thermal treatment (or an acid which leaves a residue which is not harmful to catalyst activity), and then filtered and dried. On calculation, a catalytically active material is produced.

The novel contact material of this invention, when used in catalytic cracking, results in very high gasoline yields and unusually low coke yields. When promoted with a hydrogenation component such as a group VIII element, for example, Ni, Pd, Pt, Co, Rb, Ru, etc., this material also makes a superior hydrocracking catalyst. In addition, when promoted with the oxides or sulfides of a group VI-group VIII transition metal combination such as nickel or cobalt molybdate or tungstate, the contact material forms an excellent catalyst for hydrodenitrogenation of petroleum stocks.

The silica-alumina hydrogel which can be employed to make the contact material of this invention is a hydrous synthetic gel oxide material usually containing about 5–50% alumina, the balance essentially silica. Preferably the alumina content of the hydrogel is about 10 to 35% on a moisture-free basis. The hydrogel may be prepared by any one of a number of known methods. Such methods often involve forming a silica hydrogel by the precipitation of an alkali metal silicate solution with an acid such as sulfuric acid. Alumina is then precipitated by adding an alum solution to the silica hydrogel slurry and raising the pH into the alkaline range by the addition of sodium aluminate solution or by the addition of a base such as ammonium hydroxide to insure complete alumina precipitation. Conventional methods also include coprecipitation techniques wherein the acid-acting alum solution is added to the silicate solution to precipitate both silica and alumina simultaneously, perhaps with a pH adjustment for further precipitation. Also, a constant pH technique whereby the solutions of each oxide component are added continuously to a mixing vessel may be employed.

Silica and/or alumina in the gel state may also be formed by adding certain organic derivatives of these elements to water, singly or together. The useable compounds are those which can be decomposed by water to the oxide form. Alkyl silicates, usually lower alkyl, say of 1.4 carbon atoms are readily available useable materials, as are aluminum alcoholates of the same type alkyls.

The treatment of the silica-alumina hydrogel takes place in a reaction mixture containing certain proportions of nitrogen, silica and water. Thus it is often necessary or at least desirable to concentrate the gel, as by filtering or decanting it from the free water, alcohol or other liquids produced in the precipitation reaction. If the gel to be treated is acidic, it may be given a higher pH by preliminary areatment with a weak basic-acting substance, such as aqueous ammonia solution itself. The solution may be of a salt of ammonia, preferably one which will decompose, on heating, to vaporize components.

The strongly basic substituted-ammonia which can be employed to make the novel contact material of this invention may be one which can be removed by thermal decomposition in later stages of the treatment to produce the contact material. The substituted ammonia has enough solubility in water and a high enough degree of ionization to produce a pH, usually a pH greater than about 11. Suitable substituted ammonium hydroxides include those represented by the general formula,

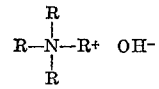

where R usually is lower alkyl of 1–6 carbon atoms, preferably methyl. Up to three R groups may be hydrogen; up to three R groups may be hydroxyalkyl (i.e., the compound may be triethanolamine) or one R may be hydroxyl or amino, including substituted amino such as N-dimethyl, N'-dialkyl hydrazine. Other electron-rich substituents can be present to increase the strength of the substituted $NH_4OH$, the factors influencing their use being cost and stability. Mixtures of these substituted ammonias may be employed, so long as the pH is not unduly lowered by the combination. The reaction of the hydrogel with the substituted ammonias is influenced by the size of the substituent groups in the ammonium ion. Larger substituent groups inhibit the crystallization of the aluminosilicate and thus, when these are used, higher temperatures and longer times may be required for the treatment.

The organic substituted ammonium hydroxide will generally be added to the silica-alumina hydrogel as a solution in water. The dilution of this solution will generally be such as to provide about one gram-atom of nitrogen for each 10–50 moles of water in the reaction mixture, including the water in the hydrogel. Ordinarily, enough substituted ammonium hydroxide will be used to provide about 1 gram-atom of nitrogen for each 0.6–5 moles $SiO_2$, preferably 1 gram-atom of nitrogen for each 0.8–2 moles silica.

Advantageously, the temperature employed during contact is below the boiling point of water to avoid the need for pressurized equipment. A temperature of about 150 to 220° F. is preferred for the treatment; however, temperatures as high as about 550° F. may be used when pressure equipment is available to prevent evaporation of water and decomposition of the substituted ammonium hydroxide.

The base treatment is contained for a period of time sufficient to convert a desired amount of the silica-alumina gel, preferably about 5 to 50%, to the crystalline form. The conversion may be terminated after this period by reducing the pH, preferably all the way to neutrality. It is advantageous to treat the contact material with a decomposable acid, usually a water soluble organic carboxylic acid, to obtain the pH reduction. Acetic acid is preferred. After the treatment, the contact material may be washed to remove remaining soluble material and then dried to remove free water. Usually calcination at about 700–1200° F. will be employed after drying to decompose reagents and activate the contact material but where the material is to be subjected to high temperature processes the effective calcination may occur during use.

The physical form to be given the contact material is determined with a view to its further use, that is, to the type of manipulative process to which it will be exposed. In a fixed-bed process, a series of catalytic reactors may be used, some being on stream and others in the process of cleaning, regeneration, etc. In circulating catalyst systems, such as those of the fluid catalytic and "TCC" processes, catalyst moves through a reaction zone and then through a regeneration zone. In the fluid process, gases are used to convey a catalyst and to keep it in the form of a dense turbulent bed which has no definite upper interface between the dense (solid) phase and the suspended (gaseous) phase mixture of catalyst and gas. This type of processing requires the catalyst to be in the form of a fine powder, generally in a size range of about 20 to 150 microns or less. Such a fluidizable particle size may be obtained by partially dewatering the treated hydrogel slurry to about 8–14% solids in preparation for spray-drying, which converts the treated hydrogel into a microspherical-shaped powder. Alternatively, the treated gel may be formed to macro-shape by pelleting, extrusion, etc., and dried. Often the catalyst will be calcined before use, but generally in hydrocarbon cracking systems fresh catalyst is added to the regenerator where temperatures high enough for calcination in situ usually prevail. Where a fixed or moving, non-fluidized bed of catalyst is to be used, the catalyst is in macro particle size, for example, about 1/16 to 1/2 inch in diameter and 1/16 to 1 inch in length. These dimensions are usually 1/8 to 1/4 inch and may be obtained by tabletting, extruding, etc.

Catalytically promoted methods for the chemical conversion of hydrocarbons include cracking, hydrocracking, reforming, hydroforming, etc. Such reactions generally are performed at elevated temperatures, for example, about 300 to 1200 F., more often about 600 to 1000° F. Feedstocks to these processes generally comprise normally liquid and solid hydrocarbons which at the temperature of the conversion reaction are generally in the fluid, i.e., liquid or vapor, state and the products of the conversion frequently are lower boiling materials.

In particular, cracking of heavier hydrocarbon feedstocks to produce hydrocarbons of preferred octane rating boiling in the gasoline range is widely practiced and usually gives end products of fairly uniform composition. Cracking is ordinarily effected to produce gasoline as the most valuable product and is generally conducted at temperatures of about 750 to 1100° F., preferably about 850 to 950° F., at pressures up to about 2000 p.s.i.g., preferably about atmospheric to 100 p.s.i.g., and without substantial addition of free hydrogen to the system. In cracking, the feedstock is usually a mineral oil or petroleum hydrocarbon fraction such as straight run or recycle gas oils or other normally liquid hydrocarbons boiling above the gasoline range. For typical operations, the catalytic cracking of a hydrocarbon feed normally results in the conversion of about 30 to 60% of the feedstock into a product boiling in the gasoline range.

The catalytic conversion system also usually includes a regeneration procedure in which the catalyst is contacted periodically with free oxygen-containing gas in order to restore or maintain the activity of the catalyst by removing the carbon and hydrocarbons deposited on the catalyst during the conversion operation and is not removable by the simple "stripping" which ordinarily is inserted between the conversion and regeneration steps. The burning of deposits from the catalyst produces steam, to a greater or lesser extent, along with other oxidation products, which steam has a tendency to deactivate the cracking catalyst.

The invention will be better understood by reference to the following examples which should be considered illustrative only and not limiting.

EXAMPLE I 1500 grams ethyl silicate and 400 grams aluminum isopropoxide in isopropanol solution are mixed and added, with vigorous stirring, to a heel (2 liters) of deionized water to form a $SiO_2/Al_2O_3$ of small particle size (quasicolloidal). This hydrogel material is then treated with 400 grams tetramethylammonium hydroxide, $(CH_3)_4NOH$, in about 2 liters of deionized water for 24 hours at about 80° C., causing crystallization of some of the surface of the silica-alumina. The crystalline structure so formed comprises about 15% of the total silica-alumina. The treated silica-alumina is then neutralized with acetic acid, filtered and calcined for 3 hours at 900° F.

EXAMPLE II 1433 ml. of an aqueous solution of sodium silicate (8.7% $Na_2O$, 27.9% $SiO_2$) is diluted with 1383 mol. of deionized water and 50 grams of ice are added. To 300 ml. deionized water 380 grams $Al_2(SO_4)_3 \cdot 18H_2O$, 300 ml. of concentrated (36 N) $H_2SO_4$ and 1000 grams of ice are added. The two solutions are mixed at a temperature below 15° C. to produce a silica-alumina hydrosol having a pH of 2. After gelation, the gel is dispersed in aqueous ammonia, bringing the pH to 7–9 and precipiating the aluminum in situ. Then the gel is washed with ammonium carbonate solution to remove the sodium and sulfate ions. The washed hydrogel is then treated with 575 grams triethanolamine in about 2 liters of deionized $H_2O$ at about 100° C. for 24 hours to transform about 15% of the silica-alumina into a crystalline material. After treatment, the mix is neutralized with acetic acid, filtered, and calcined 3 hours at 900° F.

Subsequent contact of these materials under cracking conditions with hydrocarbon oils boiling generally above the gasoline range, show the solid materials of this invention to be effective catalysts of good activity and high selectivity, producing good yields of high quality gasoline and having especially low coke makes.

It is claimed:
1. A method for making a contact material having a crystalline alumino-silicate portion in a non-crystalline silica-alumina hydrogel matrix which consists essentially of treating a silica-alumina hydrogel with an aqueous solution of a strongly basic, lower alkyl substituted ammonia having the general formula

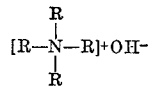

where 1 to 4 R groups are lower alkyl of from 1 to about 6 carbon atoms, 0 to 3 R groups are hydrogen and 0 to 1 groups are selected from the group consisting of hydroxyl and amino, until about 1 to 75% of the hydrogel is converted to a crystalline material, neutralizing the base and drying the solid material.

2. The method of claim 1 in which the solids content of the silica-alumina hydrogel is about 10–50% alumina, the balance essentially silica.

3. The method of claim 2 in which the alumina content is about 10 to 35% of the solids.

4. The method of claim 1 in which the treating mixture contains about one gram-atom of nitrogen for each 0.6–4 moles of silica and each 10–50 moles water.

5. The method of claim 4 in which the treating mixture contains about one gram-atom of nitrogen for each 0.8–2 moles of silica.

6. The method of claim 1 in which about 5 to 50% of the gel is converted to crystalline material.

7. The method of claim 6 in which the substituted ammonia is tetramethyl ammonium hydroxide.

8. A method for making a contact material having a crystalline aluminosilicate portion in a noncrystalline silica-alumina hydrogel matrix which consists essentially of treating a silica-alumina hydrogel, in which the solids content of said hydrogel is about 10–50 weight percent alumina, the balance essentially silica, with an aqueous solution of a strongly basic, lower alkyl-substituted ammonia, said solution containing about one gram-atom of nitrogen for each 0.6–4 moles of silica and each 10–50 moles of water, continuing said treating until about 1 to 75 percent of said hydrogel is converted to a crystalline material neutralizing the base, and drying the solid material.

9. The method of claim 8 wherein the substituted ammonia is tetramethyl ammonium hydroxide.

10. The method of claim 8 wherein the alumina content of the hydrogel is about 10 to 35% of the solids.

11. The process of claim 8 wherein the treating mixture contains about one gram-atom of nitrogen for each 0.8 to 2 moles of silica.

12. The process of claim 8 wherein said hydrogel has a pH in the acid range and is treated with a weak, basic-acting substance selected from the group consisting of aqueous ammonia and aqueous salts of ammonia prior to said treatment with the lower alkyl-substituted ammonia solution.

References Cited

UNITED STATES PATENTS

| | | | |
|---|---|---|---|
| 3,244,643 | 4/1966 | Schwartz | 252—455 |
| 3,247,195 | 4/1966 | Kerr | 252—430 X |
| 3,306,922 | 2/1967 | Barrer et al. | 252—430 X |

PATRICK P. GARVIN, *Primary Examiner.*

C. F. DEES, *Assistant Examiner.*